US010461302B2

(12) United States Patent
Mori et al.

(10) Patent No.: US 10,461,302 B2
(45) Date of Patent: Oct. 29, 2019

(54) BATTERY WIRING MODULE

(71) Applicant: Sumitomo Wiring Systems, Ltd., Yokkaichi, Mie (JP)

(72) Inventors: Ryota Mori, Mie (JP); Hiroshi Sato, Mie (JP); Hisayoshi Yaita, Mie (JP); Masami Suzuki, Mie (JP); Koki Kawamura, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 46 days.

(21) Appl. No.: 15/934,013

(22) Filed: Mar. 23, 2018

(65) Prior Publication Data

US 2018/0294464 A1  Oct. 11, 2018

(30) Foreign Application Priority Data

Apr. 11, 2017  (JP) ................. 2017-078126

(51) Int. Cl.
| | | |
|---|---|---|
| *H01M 2/00* | (2006.01) | |
| *H01M 2/20* | (2006.01) | |
| *H01M 2/04* | (2006.01) | |
| *H01M 2/06* | (2006.01) | |
| *H01M 2/10* | (2006.01) | |

(52) U.S. Cl.
CPC ......... *H01M 2/206* (2013.01); *H01M 2/0434* (2013.01); *H01M 2/06* (2013.01); *H01M 2/1077* (2013.01); *H01M 2220/20* (2013.01)

(58) Field of Classification Search
CPC .. H01M 2/206; H01M 2/0434; H01M 2/1077; H01M 2/06; H01M 2220/20
See application file for complete search history.

(56) References Cited

U.S. PATENT DOCUMENTS

| | | | | |
|---|---|---|---|---|
| 2009/0274952 | A1* | 11/2009 | Wood ...................... | B60L 50/64 429/99 |
| 2014/0287622 | A1* | 9/2014 | Kinoshita ............. | H01M 2/206 439/595 |
| 2015/0243950 | A1* | 8/2015 | Hara ................... | H01M 2/1077 429/99 |

FOREIGN PATENT DOCUMENTS

JP  2013161566 A  8/2013

\* cited by examiner

*Primary Examiner* — Chanceity N Robinson
*Assistant Examiner* — Monique M Wills
(74) *Attorney, Agent, or Firm* — Reising Ethington, P.C.

(57) ABSTRACT

A battery wiring module that can ensure an insulation distance between an electrode of a secondary battery and a conductive part arranged above the cover portion. A housing includes first and second divided housings that respectively include a bus bar housing portion that houses a bus bar, a first cover portion that is provided in one piece with the first divided housing and covers an opening of the bus bar housing portion of the first divided housing, and a second cover portion that is provided in one piece with the second divided housing and covers an opening of the bus bar housing portion of the second divided housing, the first and second cover portions being adjacent to each other. The first cover portion is provided with a tongue piece that extends from the first cover portion toward the second cover portion and overlaps the second cover portion in the opening direction of the bus bar housing portion.

3 Claims, 3 Drawing Sheets

BATTERY WIRING MODULE

CROSS REFERENCE TO RELATED APPLICATIONS

This application claims the priority of Japanese patent application JP2017-078126 filed on Apr. 11, 2017, the entire contents of which are incorporated herein.

TECHNICAL FIELD

The present invention relates to a battery wiring module that is to be attached to a high-voltage secondary battery for a vehicle.

BACKGROUND ART

As disclosed for example in JP 2013-161566A, a battery wiring module is attached to a high-voltage secondary battery that is mounted on a vehicle such as an electric vehicle or a hybrid vehicle as a power supply for driving the vehicle. The battery wiring module includes a housing that is to be attached to a secondary battery, a bus bar connected to an electrode of the secondary battery that is inserted into the inside of the housing, and an electrical wire connected to the bus bar.

The housing of the battery wiring module in JP 2013-161566A is constituted of a plurality of divided housings arranged adjacent to each other. Each divided housing includes a bus bar housing portion to that houses a bus bar. Also, each divided housing is provided with a cover portion in one piece that closes an opening of the bus bar housing portion, and the cover portions are configured so as to be adjacent to each other. The role of the cover portion is to prevent the bus bar in the bus bar housing portion and the secondary battery from contacting an electrode, and to secure an insulation between the inside and outside of the bus bar housing portion. In this battery wiring module of JP 2013-161566A, a housing having a divided structure makes it possible to absorb deformations due to heat expansion or a tolerance of the secondary battery with the play between the divided housings, thereby restricting unintended deformation of the housing.

JP 2013-161566A is an example of related art.

SUMMARY

There is a problem with the battery wiring module as mentioned above in that, due to gaps occurring between the adjacent cover portions, an insulation distance (spatial distance) across the gap between the electrode of the secondary battery in the bus bar housing portion and a conductive part arranged above the housing (above the cover portion) becomes short via the gap.

The present design has been made to solve the above-mentioned problem and the object thereof is to provide a battery wiring module that can secure the insulation distance between the electrode of the secondary battery in the bus bar housing portion and a conductive part arranged on above the cover portion.

A battery wiring module to solve the above-mentioned problem is provided with a housing that is to be attached to a secondary battery for a vehicle, bus bars to be connected to electrodes of the secondary battery that are inserted into the inside of the housing, and an electrical wire connected to the bus bar, the housing including a first divided housing and a second divided housing each having a bus bar housing portion that houses one of the bus bars, a first cover portion that is provided in one piece with the first divided housing and covers an opening of the bus bar housing portion of the first divided housing, a second cover portion that is provided in one piece with the second divided housing and covers an opening of the bus bar housing portion of the second divided housing, the bus bar housing portions of the first and second divided housings being adjacent to each other, and the first and second cover portions being adjacent to each other, and the first cover portion is provided with a tongue piece that extends from the first cover portion toward the second cover portion and overlaps the second cover portion in the opening direction of the bus bar housing portion.

With this configuration, the insulation distance (spatial distance) between the electrode of the secondary battery in the bus bar housing portion and a conductive part arranged above the cover portion is wrapped around the tongue piece of the first cover portion, so that the insulation distance can be prolonged.

In the above battery wiring module, the tongue piece may be positioned on the inside of the bus bar housing portion relative to the second cover portion.

With this configuration, due to the tongue piece being positioned on the inside of the bus bar housing portion relative to the second cover portion, the outer surfaces of the first and second cover portions can be made flat.

In the above wiring module, the tongue piece may be provided with a protruding portion that protrudes from a part overlapping the second cover portion in the direction away from the second cover portion.

With this configuration, erroneous assembly in which the tongue piece overlaps the second cover portion in an opposite order (erroneous assembly in which the tongue piece overlaps the outside of the second cover portion) can be prevented.

With the battery wiring module according to the present design, it is possible to ensure the insulation distance between the electrode of the secondary battery and a conductive part arranged above cover portion.

EMBODIMENTS

Figure 1:
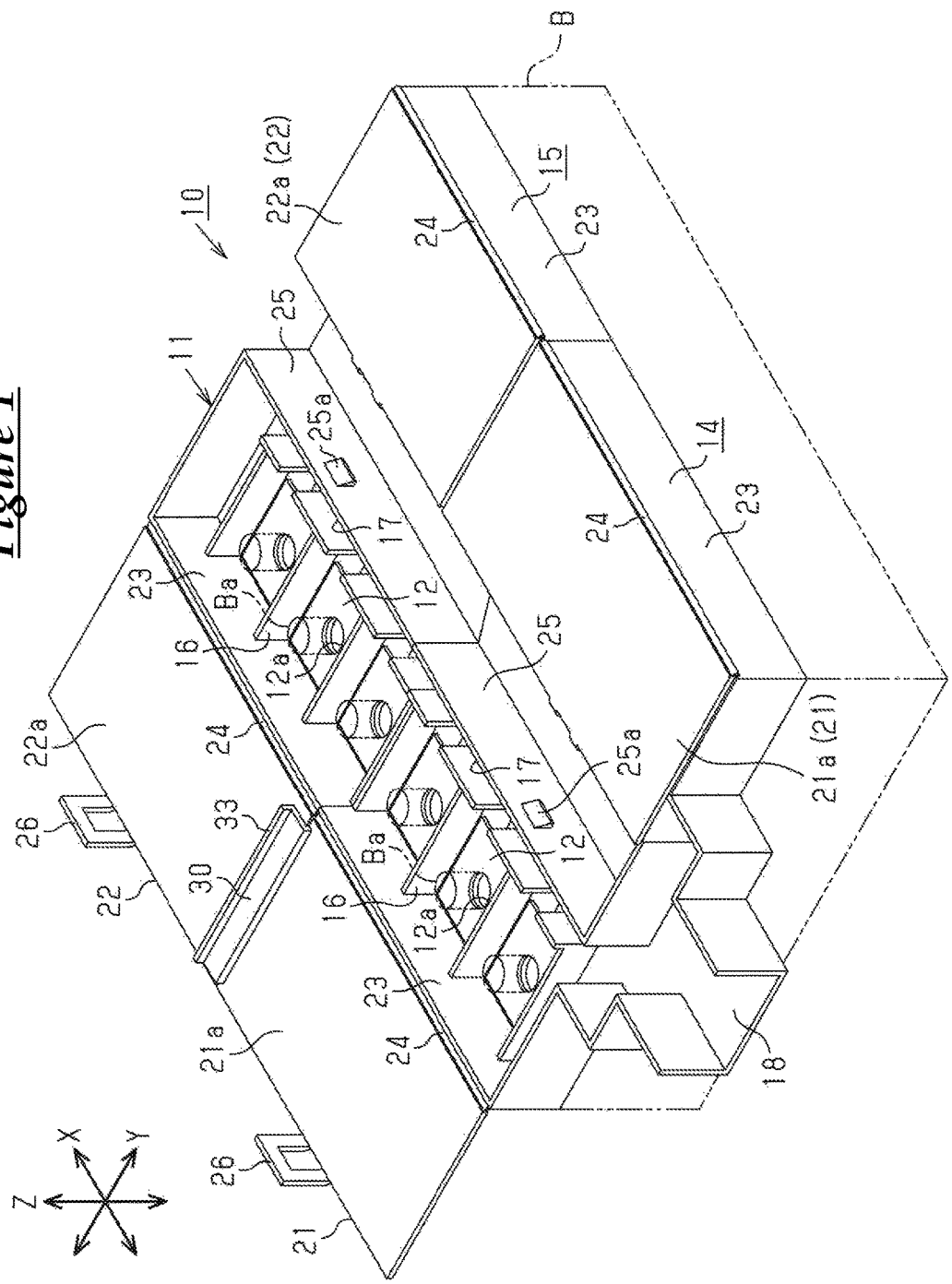
FIG. 1 is a perspective view of a battery wiring module according to one embodiment.

The following describes an embodiment of a battery wiring module with reference to FIGS. 1 to 4. In the following description, a depth direction X, a width direction Y, and a height direction Z of the battery wiring module are three directions that are orthogonal to each other (X, Y, and Z in the drawings). In the drawings, some structures may be exaggerated or simplified for illustrative reasons. In addition, the aspect ratio of individual parts may differ from their actual aspect ratio.

A battery wiring module 10 according to the present embodiment shown in FIG. 1 is to be attached to a high-voltage on-board secondary battery B that is mounted on a vehicle such as an electric vehicle or a hybrid vehicle. The secondary battery B supplies power to a motor (not shown)

for driving the vehicle, and is charged using power generated by a motor or a generator, depending on the state of charge. The secondary battery B is configured as, for example, a battery module formed by stacking a plurality of plate-shaped batteries in the depth direction X. One end of secondary battery B in the depth direction X serves as a positive electrode, and the opposite end in the depth direction X serves as a negative electrode.

Figure 2:
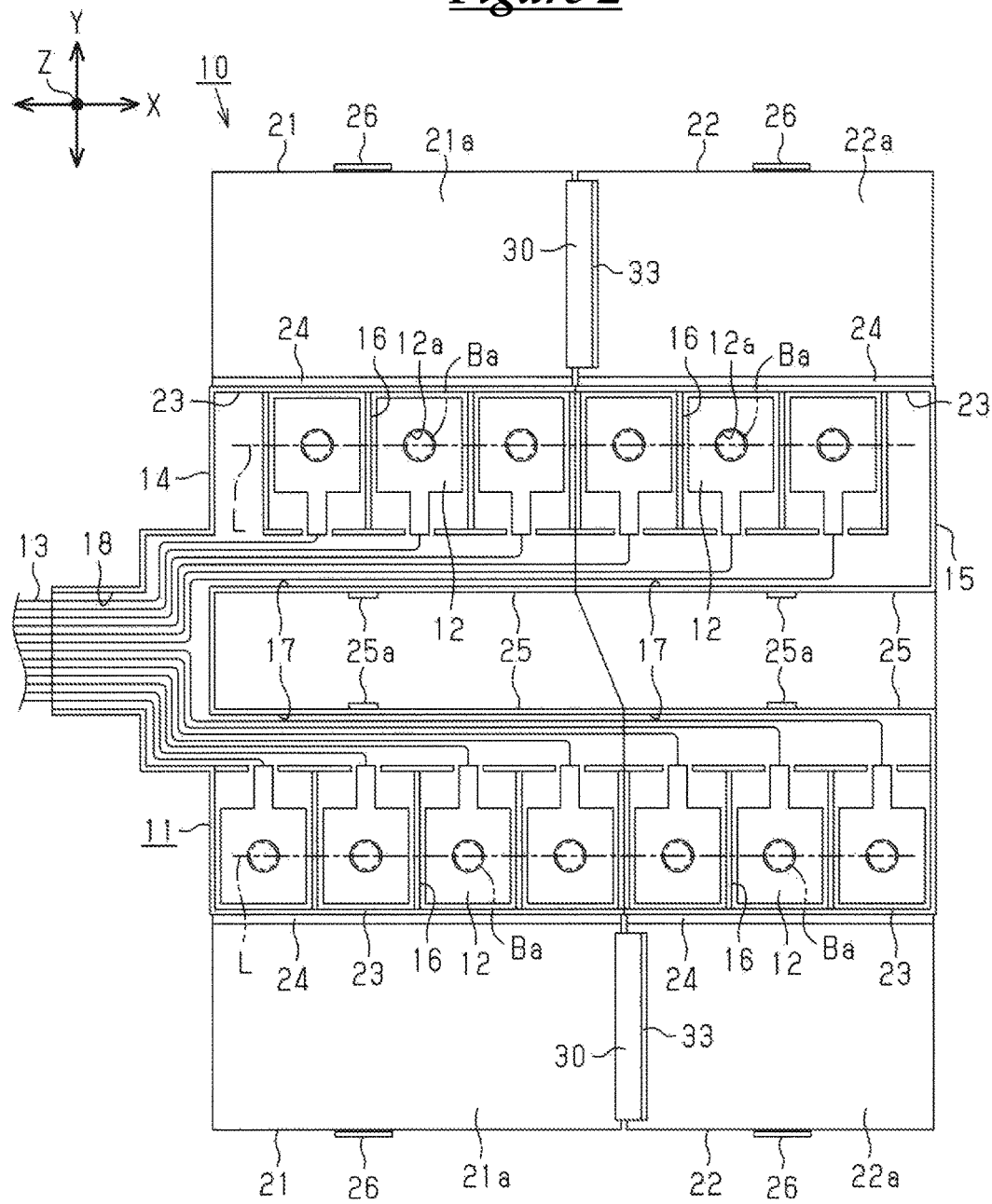
FIG. 2 is a plan view of a battery wiring module according to this embodiment.
Figure 3:
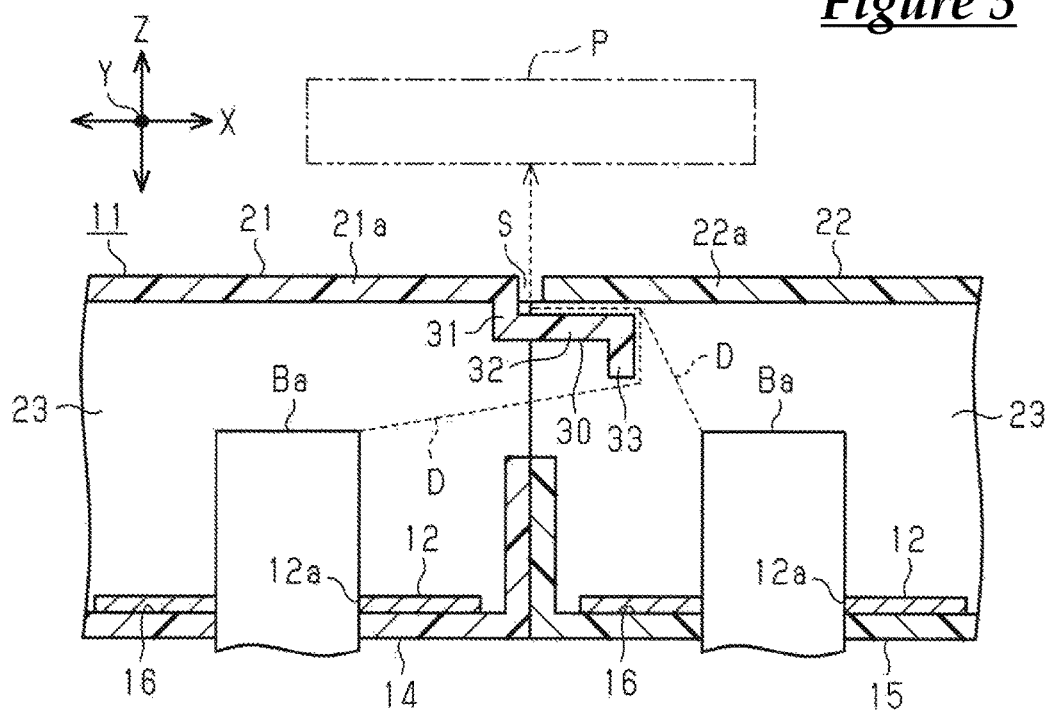
FIG. 3 is a cross-sectional view of a battery wiring module according to this embodiment.

As shown in FIGS. 1 and 2, the battery wiring module 10 includes a housing 11 that is attached to an upper portion of the secondary battery B, a plurality of bus bars 12 that are housed in the housing 11, and a plurality of electrical wires 13 (see FIG. 2) that are housed in the housing 11 and connected to the bus bars 12. The plurality of plate-shaped batteries included in the secondary battery B are connected in series via the bus bars 12. The housing 11 is formed by injection molding using a synthetic resin material.

The housing 11 has a structure that is divided in the middle in the depth direction X. One divided housing is referred to as "first divided housing 14", and the other is referred to as "second divided housing 15". The first and second housings 14 and 15 each include a plurality of bus bar housing portions 16 that open upward (in a direction away from the secondary battery), and electrical wire housing portions 17 that also open upward. In the state in which the first and second divided housings 14 and 15 are arranged side by side in the depth direction X, the plurality of bus bar housing portions 16 are arranged in two rows in the depth direction X, and the electrical wire housing portions 17 are provided inward of these rows (inward with respect to the width direction Y).

Each bus bar housing portion 16 houses a plate-shaped bus bar 12. An electrode Ba of the secondary battery B is inserted in the height direction Z in each bus bar housing portion 16, into an insertion hole 12a formed in the bus bar 12. The electrodes Ba and the bus bars 12 are connected electrically to each other with fastening by bolts, welding, or the like, which is not shown.

As shown in FIG. 2, the electrical wires 13 connected to the bus bars 12 are routed through the electrical wire housing portions 17 to an electrical wire guide-out portion 18 formed in the first divided housing 14. Then, the end portion of each electrical wire 13 guided out from the electrical wire guide-out portion 18 is connected to, for example, a connector portion which is not shown. This connector portion is connected to, for example, an ECU (Electrical Control Unit) for charge control mounted on a vehicle.

As shown in FIGS. 1 and 2, the first divided housing 14 is formed in one piece with a pair of first cover portions 21 that cover the rows of the bus bar housing portions 16 of the first divided housing 14. Similarly, the second divided housing 15 is formed in one piece with a pair of second cover portions 22 that cover the rows of the bus bar housing portions 16 of the second divided housing 15. The first cover portions 21 have flat cover bodies 21a, and similarly, the second cover portions 22 have flat cover bodies 22a.

The cover bodies 21a of the first cover portions 21 are connected to the first divided housing with hinge portions 24 formed at the upper end of the outer side walls 23 that are each positioned on both sides, in the width direction Y, of the first divided housing 14. The cover bodies 21a are configured to cover, from above, the rows of the closest bus bar housing portions 16 and the closest electrical wire housing portion 17 in the closed position. In addition, the cover bodies 21a are configured to rotate about the hinge portions 24 and to move to an open position in which the bus bar housing portions 16 and the electrical wire housing portions 17 are released. In each cover body 21a, an engaging part 26 that is engaged with a projecting part 25a, in a closed position in which the bus bar housing portion 16 and the electrical wire housing portion 17 are closed, is formed on an inner wall 25 of the first divided housing 14.

The second cover portions 22 on the second divided housing 15 side have a configuration that is substantially the same as the above configuration of the first cover portions 21 on the first divided housing 14 side. For this reason, the structures of the second cover portions 22 on the second divided housing 15 side that are similar to the first cover portions 21 on the first divided housing 14 side are assigned the same reference numerals, and their detailed description will be omitted.

In the state in which the first and second divided housings 14 and 15 are adjacently arranged in the depth direction X, the rows of the bus bar housing portions 16 of the first divided housing 14 and the rows of the bus bar housing portions 16 of the second divided housing 15 are adjacent to each other in the depth direction X. The cover bodies 21a of the first cover portions 21 and the cover bodies 22a of the second cover portions 22 are adjacent to each other in the depth direction X in the state in which the two are in the closed position. The upper sides of the cover bodies 21a and 22a of the first and second cover portions 21 and 22 are planar, and are configured to lie in the same plane.

Here, each of the first cover bodies 21 is provided with a tongue piece 30 extending from the cover body 21a toward the second cover portion 22 side and formed in one piece with it. The configuration of the tongue piece 30 will be described with reference to FIG. 3. Note, that the configuration of the tongue piece 30, such as its shape, will be described for the state in which the first and second cover portion 21 and 22 are in the closed position. The tongue piece 30 has a first extending portion 31 that extends from the end portion of the cover portion 21a on the second cover portion 22 side downward (toward the inside of the bus bar housing portion 16), and a second extending portion 32 that extends from the lower end of the first extending portion 31 to the second cover portion 22 side in the depth direction X. The second extending portion 32 is a plate that is perpendicular to the height direction Z. A part of the second extending portion 32 is positioned underneath (to the inside of the bus bar housing portion 16) the cover body 22a of the second cover portion 22. That is, a part of the second extending portion 32 overlaps the cover body 22a of the second cover portion 22 in the height direction Z (the opening direction of the bus bar housing portion 16). The electrodes Ba are arranged on a line L along the depth direction X, and are configured such that the tongue piece 30 (the second extending portion 32) is positioned above the line L when the first cover portion 21 is in the closed state (see FIG. 2).

The tongue piece 30 has a protruding portion 33 that protrudes downward from the second extending portion 32, that is, in direction away from the cover body 22a. In this embodiment, the protruding portion 33 protrudes downward in the depth direction X from the front end portion of the second extending portion 32 that is at a location overlapping the cover body 22a. The protruding portion 33 is plate-shaped and perpendicular to the depth direction X. Note that the tongue piece 30 in this embodiment has a length which is slightly shorter than the length of the cover body 21a in the width direction Y.

The following will describe the operative effect of this embodiment.

In the state in which the secondary battery B to which the battery wiring module 10 is attached is mounted on a vehicle, a conductive part P on the vehicle side is positioned above the battery wiring module 10 (above the first and second cover portions 21 and 22). The insulation distance D (spatial distance) between this conductive part P and the electrodes Ba in the bus bar housing portions 16 is a distance that passes through the gap S between the cover bodies 21a and 22a of the first and second cover portions 21 and 22. Here, due to the first cover portion 21 being provided with the tongue piece 30 that overlaps the second cover portion 22 (the cover body 22a), the insulation distance D is wrapped around the tongue piece 30, so that the insulation distance D can be prolonged.

Also, in this embodiment, since the tongue piece 30 of the first cover portion 21 is positioned below (to the inside of the bus bar housing portion 16) the cover body 22a of the second cover portion 22, it is necessary to close the first cover portion 21 prior to the second cover portion 22 when assembling the battery wiring module.

Figure 4:
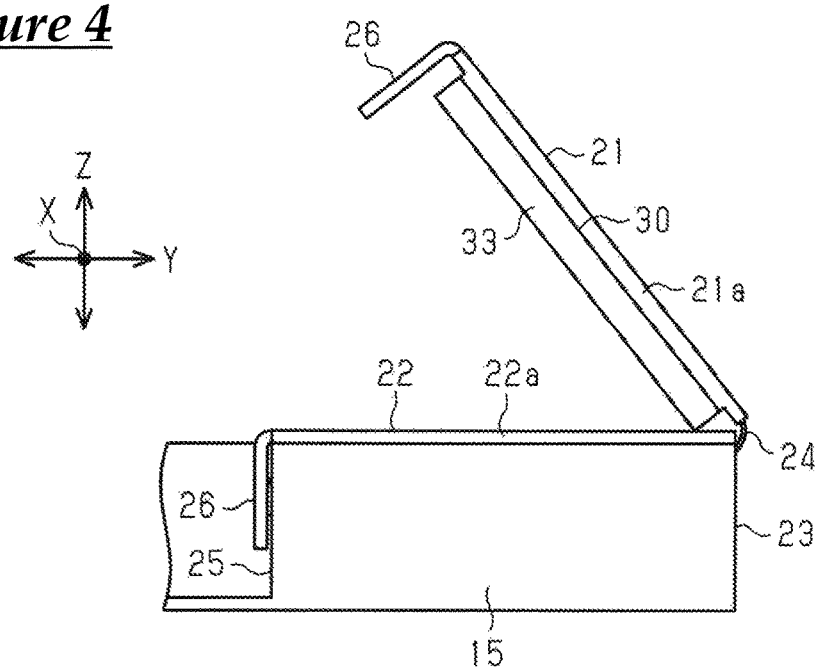
FIG. 4 is a side view of a battery wiring module according to this embodiment.

Here, as shown in FIG. 4, if the first and second cover portions 21 and 22 are closed in the wrong order and the first cover portion 21 is rotated and closed after closing the second cover portion 22, the protruding portion 33 of the tongue piece 30 hits against the cover body 22a of the second cover portion 22, so that closing the first cover portion 21 becomes difficult. Therefore, erroneous assembling with the reverse order of closing the first and second cover portions 21 and 22 can be prevented, and the operator can easily notice that the first and second cover portions 21 and 22 have been closed in the wrong order.

In addition, if the first cover portion 21 is closed after closing the second cover portion 22, the tongue piece 30 of the first cover portion 21 runs on the upper surface of the cover body 22a of the second cover portion 22. At this time, the first cover portion 21 hovers above the second cover portion 22 at the height of the protruding portion 33 of the tongue piece 30, and this hovering of the first cover portion 21 can be easily noticed visually. Therefore, it is easy to notice the erroneous assembly of the first and second cover portions 21 and 22.

The following will describe the effects of this embodiment.

The first cover portion 21 is provided with the tongue piece 30 that extends from the cover body 21a toward the second cover portion 22, and overlaps the second cover portion 22 (the cover body 22a) in the opening direction of the bus bar housing portion 16 (the height direction Z). With this configuration, the insulation distance D (spatial distance) between the electrode Ba of the secondary battery B in the bus bar housing portion 16 and the conductive part P arranged above the first and second cover portion 21 and 22 is wrapped around the tongue piece 30 of the first cover portion 21, so that the insulation distance D can be prolonged.

The tongue piece 30 is positioned inward of the bus bar housing portion 16 relative to the second cover portion 22 (the cover body 22a). Therefore, a configuration is possible where the tongue piece 30 does not protrude above the cover body 21a and 22a (away from the bus bar housing portion 16), and as a result, the upper sides of the first and second cover portions 21 and 22 that constitute the upper side of the housing 11 can be made flat.

The tongue piece 30 has a protruding portion 33 that protrudes from the second extending portion 32 that overlaps the cover body 22a of the second cover portion 22 in the direction away from the cover body 22a. With this configuration, erroneous assembly in which the tongue piece 30 overlaps the second cover portion 22 in an opposite order (erroneous assembly in which the tongue piece 30 is placed on the outside of the second cover portion 22) can be prevented.

Note that it is possible to modify the above embodiment as follows.

In this embodiment, although the electrical wire guide-out portion 18 is provided to the first divided housing 14, it is also possible to provide the electrical wire guide-out portion 18 to the second divided housing 15.

The configuration of the tongue pieces 30 such as its shape is not limited to the above embodiment, and may be changed as appropriate depending on the configurations of the first and second divided housings 14 and 15, and the cover bodies 21a and 22a of the first and second cover portions 21 and 22. It is also possible, for example, to omit the protruding portions 33 from the tongue pieces 30 in the abovementioned embodiment.

In the above-mentioned embodiment, in the closed state of the first and second cover portions 21 and 22, the tongue pieces 30 are positioned below the cover bodies 22a (to the inner side of the bus bar housing portions 16); however, there is no limitation to this configuration. A configuration is also possible where the tongue pieces 30 are positioned above the cover bodies 22a (to the outer side of the bus bar housing portions 16).

In the above embodiment, the tongue pieces 30 (the second extending portions 32) extend perpendicular to the height direction Z; however, there is no limitation to this configuration. It is also possible, for example, to configurate such that the tongue pieces 30 incline toward the cover bodies 22a. Note that it is desirable that the shape of the tongue pieces 30 has no influence on the layout of the inside of bus bar housing portions 16 and the like.

The length of the tongue pieces 30 in the width direction Y is not limited to the length in the above embodiment, and a configuration is also possible where the length of the tongue pieces 30 in the width direction Y is shorter than in the above embodiment as long as the tongue pieces 30 are configured to intersect the line L (the line on which the electrodes Ba are arranged) in the height direction Z.

In the above embodiment, although the tongue pieces 30 are provided above a position between the electrodes Ba that are arranged in the depth direction X, a configuration is also possible where the tongue pieces 30 are positioned right above the electrodes Ba.

In the above embodiment, the first and second cover portions 21 and 22 are rotatably provided to the first and second divided housings 14 and 15, respectively. However, there is no limitation to this configuration of the above-described embodiment, as long as the first and second cover portions 21 and 22 are respectively provided to the first and second divided housings 14 and 15 in one piece.

The configurations of the first divided housing 14 and the second divided housing 15 are not limited to the above embodiment, and may also be modified as appropriate. In the above-described embodiment, for example, the electrical wire housing portions 17 are provided inward of the bus bar housing portions 16 in the width direction Y; however, there is no limitation to this configuration, and it is also possible to provide the electrical wire housing portions 17 outward of the bus bar housing portions 16 in the width direction Y.

In the above embodiments, the housing 11 is constituted by two divided housings (the first and second divided housings 14 and 15); however, there is no limitation to this configuration. A configuration is also possible where the number of the divided housings constituting the housing 11 is three or more. In addition, a configuration is also possible where the housing 11 is divided into individual bus bar housing portions 16.

The above-described embodiments and modifications can be combined as appropriate.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Battery Wiring Module
11: Housing
12: Bus Bar
13: Electrical Wire
14: First Divided Housing
15: Second Divided Housing
16: Bus Bar Housing Portion
21: First Cover Portion
22: Second Cover Portion
30: Tongue Piece
33: Protruding Portion
B: Secondary Battery
Ba: Electrode

What is claimed is:

1. A battery wiring module comprising:
a housing that is to be attached to a secondary battery for a vehicle;
bus bars to be connected to electrodes of the secondary battery that are inserted into the inside of the housing; and
electrical wires connected to the bus bars,
the housing including a first divided housing and a second divided housing each having a bus bar housing portion that houses one of the bus bars, a first cover portion that is provided in one piece with the first divided housing and covers an opening of the bus bar housing portion of the first divided housing, a second cover portion that is provided in one piece with the second divided housing and covers an opening of the bus bar housing portion of the second divided housing, the bus bar housing portions of the first and second divided housings being adjacent to each other, and the first and second cover portions being adjacent to each other,
wherein the first cover portion is provided with a tongue piece having a first extending portion and a second extending portion, the first extending portion extends from the first cover portion toward the bus bar housing portion, and the second extending portion extends from an end of the first extending portion toward the second cover portion and overlaps the second cover portion in the opening direction of the bus bar housing portion.

2. The battery wiring module according to claim 1, wherein the tongue piece is positioned on the inside of the bus bar housing portion relative to the second cover portion.

3. The battery wiring module according to claim 2, wherein the tongue piece includes a protruding portion that protrudes from a part overlapping the second cover portion in the direction away from the second cover portion.

* * * * *